United States Patent [19]

Wheelwright et al.

[11] 3,901,786
[45] Aug. 26, 1975

[54] ELECTROLYTIC DISSOLVER

[75] Inventors: Earl J. Wheelwright, Richland; Richard D. Fox, West Richland, both of Wash.

[73] Assignee: The United States of America as represented by the United States Energy Research and Development Administration, Washington, D.C.

[22] Filed: Apr. 10, 1974

[21] Appl. No.: 459,737

[52] U.S. Cl. ............... 204/225; 204/1.5; 204/140; 204/255; 204/268
[51] Int. Cl............................................. B23p 1/14
[58] Field of Search ............ 204/1.5, 140, 225, 255, 204/268, 287

[56] References Cited

UNITED STATES PATENTS 2,655,473  10/1953  Lowenheim ................... 204/255 X

*Primary Examiner*—John H. Mack
*Assistant Examiner*—W. I. Solomon
*Attorney, Agent, or Firm*—Dean E. Carlson; Arthur A. Churm; James W. Weinberger

[57] ABSTRACT

An electrolytic dissolver wherein dissolution occurs by solution contact including a vessel of electrically insulative material, a fixed first electrode, a movable second electrode, means for insulating the electrodes from the material to be dissolved while permitting a free flow of electrolyte therebetween, means for passing a direct current between the electrodes and means for circulating electrolyte through the dissolver. The second electrode is supported by the material to be dissolved so that, as dissolution occurs, the electrode moves with the material to maintain a close spaced relationship with the material for continued peak dissolver efficiency. The electrodes are designed for passage of the electrolyte therethrough directed at the material to be dissolved in order to rapidly remove dissolved material and bubbles evolved by the electrolysis and to cool the dissolver.

9 Claims, 2 Drawing Figures

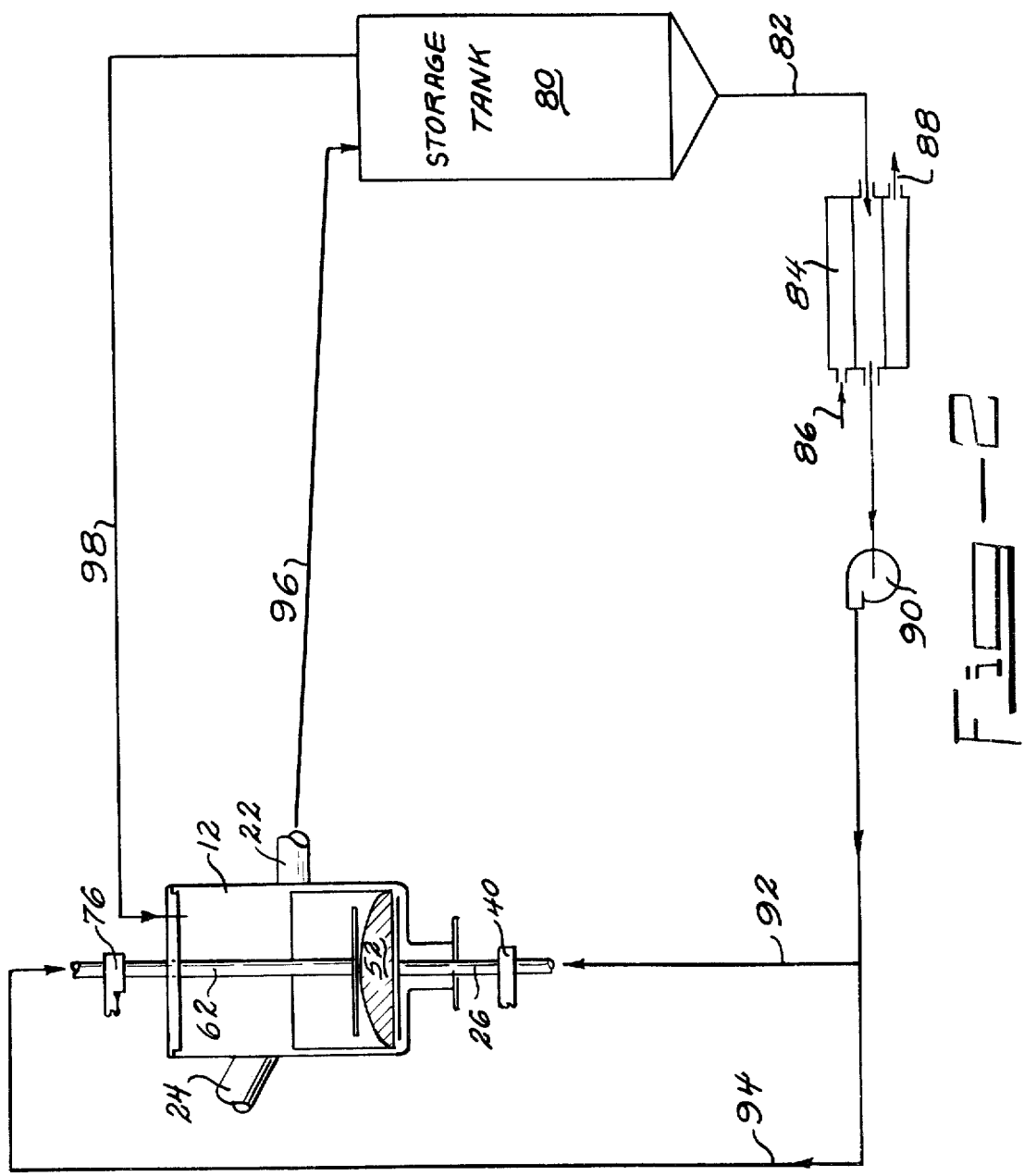

ELECTROLYTIC DISSOLVER

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to an electrolytic dissolver. In more detail, the invention relates to an electrolytic dissolver in which dissolution occurs by solution contact and to a system utilizing the dissolver.

The conversion of plutonium metal to an aqueous solution suitable for reprocessing by conventional methods is a continuing problem. Small pieces of the metal can be satisfactorily dissolved in 15 molar $HNO_3$ containing up to 0.1 mole HF at boiling temperature, but the passivity of plutonium metal in such systems greatly restricts dissolution rate. Rapid dissolution of the plutonium metal in 3 to 4 molar $HNO_3$, 0.13 molar HF has been reported, but the reaction is difficult to control. In the process currently in use at the Hanford Atomic Plant, Richland, Wash., plutonium metal buttons are mechanically sectioned into smaller pieces and burned to the oxide. The oxide is then screened, pulverized when necessary and dissolved in 12–15 molar $HNO_3$ containing HF at boiling temperatures. The oxide is difficult to dissolve, often requires several hours per batch and frequently an insoluble residue remains when the dissolution is terminated.

Electrolytic dissolution of normally passive metals in $HNO_3$ was first demonstrated a number of years ago by anodically dissolving stainless-steel-clad reactor fuels in $HNO_3$ on a small scale. An extensive discussion of electrolytic dissolution of fuel elements is contained in an article by V. P. Caracciolo and J. H. Owen entitled "3.1 Electrolytic Dissolution of Power Reactor Fuel Elements," *Progress in Nuclear Energy Series* 3, *Process Chemistry*, Vol. 4, edited by C. E. Stevenson, E. A. Mason and A. T. Gresky, Pergamon Press, Inc., New York, 1970.

Two basic electrolytic processes have been developed. In one, contact with the dissolvable material is established through the electrolyte, the "solution contact" principle, and special precautions are taken to prevent direct contact of the dissolving material with either the cathode or the anode. In the alternate process, the "metal contact" principle, the dissolvable material is physically attached to the anode or is contained in a conducting basket which serves as both the anode and the container for the dissolvable material. The "metal contact" process has shown less promise because of the difficulty in maintaining a good high-conduction contact between the anode and the dissolving material. When the contact deteriorates, electrical arcing occurs which can damage the electrodes or lead to fires if the dissolving material is pyrophoric.

In the solution contact principle, the dissolvable metal is confined between the two electrodes but physically isolated from both and the entire assembly is immersed in the dissolver solution or electrolyte. With current flowing through the dissolver, the side of the dissolvable material facing the cathode electrode becomes the anode and dissolves. There are two parallel electrical paths between the electrodes: (1) directly through the electrolyte and (2) electrolyte to dissolvable material to electrolyte. The efficiency of the dissolver depends upon the success achieved in maximizing the electrical current through the dissolvable material. The much higher resistivity of the electrolyte, compared to the dissolvable metal, is helpful in achieving proper path maximization. Thus, the ideal liquid contact cell is one in which the dissolving dissolvable material remains close to the electrodes at all times without touching them.

SUMMARY OF THE INVENTION

The electrolytic dissolver according to the present invention utilizes the "solution contact" principle. It incorporates a movable electrode to maintain a minimum distance from the dissolvable metal without direct contact in order to maximize the electrical current flowing through the dissolvable metal. The dissolver is also designed to permit a flow of electrolyte between the electrodes and the material to be dissolved to remove dissolved material and bubbles evolved by the electrolysis which will affect the flow of current through the material and decrease efficiency. The dissolver consists of a vessel of electrically insulative material for containing the acid electrolyte and the material to be dissolved, a first fixed electrode in the vessel, means for electrically insulating the first electrode from the material to be dissolved while maintaining the material and the electrode in a closely spaced relation and while allowing a free flow of electrolyte therebetween, a second movable electrode in the vessel opposite and facing the first electrode, and separated from the first electrode by the material to be dissolved including means for electrically insulating the electrode from the material to be dissolved while maintaining the material and the electrode in a closely spaced relation and while allowing a free flow of electrolyte therebetween and including means for urging the second electrode toward the first electrode, said second electrode being adapted to rest on the material to be dissolved and to move with the material toward the first electrode as the material is dissolved, thereby maintaining the closely spaced relation between the first and second electrodes and the said material, means for passing a direct current between the first and second electrodes and means for circulating a flow of electrolyte into the vessel between the first and second electrodes and the material to be dissolved.

Although solution type dissolvers are generally of low efficiency due to the fact that much of the current bypasses the article to be dissolved, taking a path through the electrolyte between the anode and cathode, we have found that the dissolver of this invention is generally quite efficient by maintaining a narrow but constant gap between the electrodes and the dissolvable material and by constantly flushing the material to be dissolved to remove any bubbles evolved thereon which could restrict the current flow and to increase the amount of current that can be passed before polarization becomes a problem.

The dissolver herein described was designed for the electrolytic dissolution of plutonium. It is also useful for other metals which may be dissolved by the solution contact approach, such as aluminum, stainless steel, Hastelloy C and other alloys.

It is therefore one object of this invention to provide an apparatus for dissolving plutonium and other metals.

It is another object of this invention to provide a rapid, safe, effective and economical apparatus for the electrolytic dissolution of plutonium and other metals.

Finally, it is the object of this invention to provide a rapid, safe, effective and economical apparatus for the electrolytic dissolution of plutonium and other metals by the solution contact method.

BRIEF DESCRIPTION OF THE DRAWINGS

FIG. 2 is a complete dissolver system incorporating the electrolytic dissolver of the invention.

DESCRIPTION OF THE PREFERRED EMBODIMENT

Figure 1:
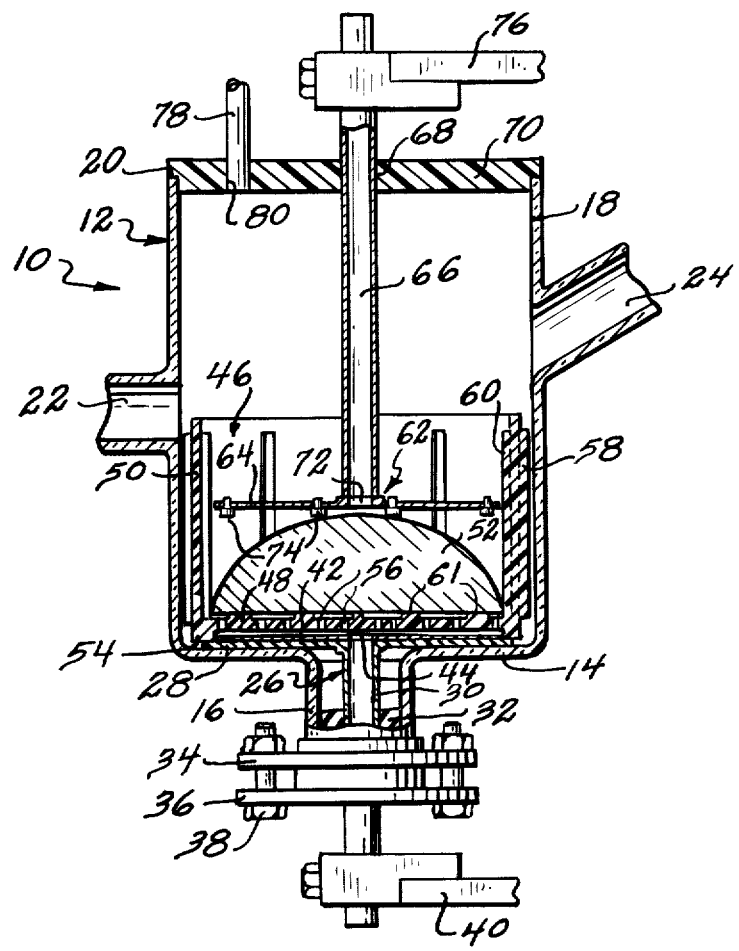
FIG. 1 is a cross-sectional view of the electrolytic dissolver of the invention.

Referring now to FIG. 1, the dissolver assembly 10 comprises a vessel 12, of electrically insulative material for containing the electrolyte and material to be dissolved, having a flat bottom 14 containing a short downwardly extending cylindrically shaped extension 16, a vertical side wall 18 and an open top 20. In side wall 18 about midway between bottom 14 and top 20 are an electrolyte overflow outlet 22 and slightly above this in the opposite wall an off-gas outlet 24. Located in vessel 12 is a first electrode 26 which is the anode consisting of a horizontal disc portion 28 resting on bottom 14 and a tubular stem 30 attached perpendicularly thereto extending downward through extension 16 wherein it is sealed by an annular plug 32 and secured in place by flange 34 and plate 36 held together by a plurality of fasteners 38. A connector 40 is attached to stem 30 below extension 16 to provide electrical contact. The upper surface of disc 28 is covered with a disc 42 of conductive, nonoxidizing material such as platinum to provide improved electrical contact between electrode 26 and the electrolyte. An opening 44 in both discs where stem 30 is attached to disc 28 permits a flow of electrolyte through stem 30 into vessel 12.

A basket 46 of electrically insulative material having a flat bottom 48 and a vertical side wall 50 contains the material to be dissolved 52 and insulates it electrically from electrode 26. A free flow of electrolyte about basket 46 and material to be dissolved 52 is obtained by spacing basket 46 from electrode 26 by a plurality of evenly spaced lower projections 54 about the lower outer edge of bottom 48 which contains a plurality of perforations 56 and is spaced from side wall 18 by a plurality of vertical bar-shaped projections 58 on the outer surface of wall 50, while a plurality of vertical bar-shaped projections 60 on the inner surface of wall 50 space the material to be dissolved. Material 52 is elevated above the bottom 48 of basket 46 by a plurality of bar-shaped projections 61. Located in basket 46 directly above the material to be dissolved 52 and resting thereon is a second movable electrode which is the cathode consisting of a horizontal disc portion 64 and a tubular stem 66 attached perpendicularly thereto and extending out top 20 of vessel 12 where it passes in a slidable sealing relation through a passage 68 in top enclosure 70. An aperture 72 in disc 64 where stem 66 is attached thereto permits a flow of electrolyte through stem 66 into vessel 12 and around material 52. Disc 64 also contains a plurality of button-shaped spacers 74 of electrically insulative material to separate electrode 62 from the material to be dissolved 52 while permitting the electrode to rest on and be supported by material 52 so that the electrode will move in a downward direction by gravitational forces as the material 52 is dissolved and yet maintain a spaced relationship thereto to prevent contact between the electrode 62 and the material 52. An electrical connector 76 is attached to stem 66 above top enclosure 70 and a vent return line 78 which passes through top 70 through passage 80 completes the dissolver assembly.

In the operation of the dissolver, the material to be dissolved 52, such as a plutonium button, is placed in basket 46 which rests on first electrode 26 to insulate the plutonium from the electrode. The second electrode 62 is placed on the plutonium button and is electrically insulated from it by the spacers 74. A flow of electrolyte, such as, for example, 10 M $HNO_3$, is passed through tubular stems 30 and 66 into vessel 12 and a D.C. potential is established between the first electrode 26, which is the anode, and the second electrode 62, which is the cathode. As dissolution takes place, bubbles formed and plutonium dissolved are washed away and the dissolver is kept cool by the flowing electrolyte which flows from vessel 12 through overflow port 22. As the top of the plutonium button dissolves, electrode 62 drops by gravity to maintain a closely spaced relationship with the plutonium without physical contact to ensure a maximum flow of current, thus promoting efficient and rapid dissolution of the metal.

Operation of the electrolytic dissolver of the invention in a complete dissolver system may be examined by referring to FIG. 2. The electrolytic solution is stored in storage tank 80 from which it flows through line 82 to heat exchanger 84 having water coolant inlet 86 and outlet 88 for cooling the electrolyte. The cooled solution is forced by circulation pump 90 through lower feed line 92 and upper feed line 94 through electrodes 26 and 62, respectively, which have been previously energized by a source of D.C. current (not shown) through connectors 40 and 76 to provide a flow of electrons through and around the material to be dissolved 52. The electrolyte passes through electrodes 26 and 62 and passes over and around material 52, removing dissolved material and washing away bubbles as these are formed on the material 52 in addition to cooling the dissolver. The electrolyte passes from vessel 12 through overflow 22 through line 96 to storage tank 80 from whence the electrolyte may then be recirculated. A vent return line 98 extends from the top of tank 80 to dissolver vessel 12 to equalize and prevent buildup of any gas which may develop within the system. The gas generated during dissolution is carried from the system through off-gas outlet 24 to be scrubbed and treated (not shown) to remove any toxic materials before being vented to the atmosphere.

It has been found that the electrolyte solution should be maintained at a composition of at least about 10 molar $HNO_3$ to increase the current threshold at which cathode damage due to hydrogen embrittlement takes place and about 0.05 M HF in order to prevent formation of solids during the dissolution. This acid concentration can be maintained by the addition of highly concentrated acids such as about 15.6 M $HNO_3$ during the course of the dissolution of the metal. In a production unit, the acid concentration could be most easily controlled by a continuous removal of electrolyte and replenishment with fresh acid. A solution of 14 M $HNO_3$ and 0.05 M HF should prove to be close to optimum for this purpose.

The cathode may be constructed of any conductive material which can withstand the environment of the dissolver. Suitable materials which meet this requirement are tantalum, niobium, platinum and stainless steel. The anode must be constructed of a nonoxidizing metal such as platinum or may be constructed of a semiconducting metal such as tantalum or niobium if the electrode surface which faces the cathode is covered with a nonoxidizing metal such as platinum. If the anode is not covered with a nonoxidizing metal, after a period of rapid anodization, the surface of the anode becomes not only inert to the chemical and electrochemical processes which take place in the dissolver, but the surface also becomes non-conducting.

The dissolver used may be constructed of any inert non-conductive material which is physically strong and is resistant to the chemicals at the temperature at which dissolution takes place. Such materials may be a glass such as Pyrex or plastics such as Kynar or Teflon.

SPECIFIC EMBODIMENT OF THE INVENTION

According to a preferred embodiment of the present invention, the electrolytic dissolver may be used to dissolve fuel elements from existing reactors in addition to dissolving plutonium metal buttons. For this latter purpose, a dissolver vessel was fabricated from a short section of 5-inch I.D. Pyrex glass pipe with 1-inch flanged Pyrex glass pipe openings as shown in FIG. 1. The anode was formed of a 4.6-inch diameter tantalum disc welded to the end of a ⅜-inch O.D. tantalum tube with a 1/16-inch-thick wall. It was known that, after an initial rapid anodization, the surface of the tantalum anode would become inert to the chemical and the electrochemical processes which take place in the surface and also became non-conducting. This problem was overcome by facing the anode with a 4-inch diameter platinum disc. A ¼-inch hole drilled through the center of the platinum disc and tantalum disc permitted circulation of the electrolyte fluid through the anode. A tantalum cathode was fabricated in a manner similar to the anode but the platinum surface was not required. A number of press fit Teflon insulators were inserted into holes on the face of the cathode to provide a ⅛-inch minimum physical separation at all times between the cathode and the surface of the plutonium metal. The cathode was free to move in a vertical motion under the influence of gravity. The dissolver basket was machined from a block of polypropylene and was supported by 8 feet, ⅛-inch deep, spaced around the bottom diameter. Eight equally spaced external flutes 1/10-inch high provided solution transfer space between the walls of the basket and the dissolver vessel and for similar reasons, the inside surface of the basket wall contained eight equally spaced flutes. The floor of the basket was perforated with an array of ⅛-inch holes and contained eight equally spaced radial ribs 1/16-inch high to support the plutonium metal button and to provide space for the flow of solution between the plutonium metal and the perforated floor of the basket. A Teflon plug with a machined taper served to seal the anode in the bottom of the dissolver vessel. With the basket in place, the volume of the dissolver at overflow conditions was 800 ml. The total volume with the overflow blocked was 1,800 ml. The D.C. power supply was rated at 200 A, although it was operated at no more than 150 A. The voltage was limited to about 14 V.

Eight plutonium metal buttons were dissolved using the apparatus of this invention. The dissolver system as shown in FIG. 2 was filled with 10 M $HNO_3$, which equalled about 7.4 liters. The plutonium button was placed in the basket and lowered into the dissolver. The pump circulating the electrolyte was started and circulated the fluid at a rate of 4 to 5 liters per minute, and D.C. power supply rated at 200 amps with voltage limited to 14 volts was connected to the electrodes. The power supply was turned on and the voltage was adjusted to 12 to 14 V. The temperature of the dissolver solution increased to the operating range of 50°–60°C within about 20 minutes, after which cooling water was circulated through the heat exchanger to maintain the temperature within the specified range. When necessary, additional 10 M $HNO_3$ was added to maintain the volume of acid in the system in the range of 7.0 to 7.4 liters. Usually the addition of 300 to 600 ml of acid during the run maintained the proper volume. The power supply was operated in a constant-current mode of operation and did compensate, within the voltage limitations of the machine, for minor fluctuations in conductivity caused by changes in the distribution of gas bubbles under the basket and between the basket and the button, changes in dissolver solution composition, or changes in the position and geometric configuration of the button as it dissolved. The conductivity of the system increased at the start of each run, as the dissolver solution temperature increased, and then very slowly decreased as the button was dissolved. The intent was to maintain the dissolver current as close to 150 A as possible, within the limits of the power supply. That power level usually could not be reached at the start or near the end of a run. After starting a run, the ammeter was read every 30 to 60 min and the power level corrected if possible. The average current values given in the table below represent the average of 12 to 20 readings for each run. In the table are shown the results of the pilot plant dissolution of a number of plutonium buttons.

| Run Number | Gross Weight, g | Net Pu Weight, g | Dissolution Time, hr | Dissolution Current, A | | | Terminal Acid Concentration, M |
|---|---|---|---|---|---|---|---|
| | | | | Minimum | Maximum | Average | |
| 1 | 1955 | 1923 | 12.8 | 137 | 150 | 146 | 4 |
| 2 | 1981 | 1950 | 13.9 | 130 | 155 | 144 | 6 |
| 3 | 1992 | 1959 | 9.9 | 120 | 145 | 135 | 7 |
| 4 | 1898 | 1867 | 15.3 | 100 | 100 | 100 | 3 |
| 5 | 2051 | 2018 | 17.4 | 100 | 103 | 101 | 5 |
| 6 | 2042 | 2008 | 15.0 | 100 | 105 | 102 | 7 |
| 7 | 2152 | 2117 | 13.1 | 112 | 125 | 120 | 6 |
| 8 | 2059 | 2026 | 14.5 | 95 | 125 | 103 | 10 |

A crack was observed in the cathode at the end of the third run and the power-level goal was reduced from 150 to 100 A for the subsequent runs. A wedge-shaped section of the cathode cracked off during Run 5 and the run was completed with a loss in cathode surface area. A new cathode was placed in service at the start of Run 6, but the current was maintained at the lower value until all of the buttons were dissolved. Embrittlement of a niobium cathode by atomic hydrogen has been reported when the dissolver solution acid concentration was reduced below the 5 to 6 molar range. The low terminal acid values in Runs 1 and 4 were suspected to be the cause of the failure of the tantalum cathode. To at least minimize this failure mechanism, starting with Run 6, 15.6 M $HNO_3$ was used for all acid additions during the run. No damage to the second cathode was ever detected.

It should be noted that a substantial quantity of very fine dark green to black solids were observed after two to three hours of dissolution and that this amount continued to increase throughout each run. X-ray analysis performed on one sample of solids indicated that most of the sample was amorphous but that the sample did contain some crystalline $PuO_2$. Other diffraction patterns including that for plutonium metal were not detected. Radiochemical analysis confirmed that the solids were mostly plutonium. Subsequently, it was found that the solids were easily dissolved in a solution of 10 M $HNO_3$ containing 0.03 M HF. It is believed that such problems can be eliminated by use of an electrolyte of 14 M $HNO_3$ and 0.05 M HF.

As can be seen from the discussion and the results given in the table above, the apparatus of this invention provides an efficient and effective means for the rapid dissolution of metals, particularly plutonium metal.

The embodiments of the invention in which an exclusive property or privilege is claimed are defined as follows:

1. An electrolytic dissolver wherein dissolution occurs by solution contact comprising:
   a. a vessel of electrically insulative material for containing an acid electrolyte and the material to be dissolved;
   b. a first fixed electrode in the vessel;
   c. a first means for electrically insulating the first electrode from the material to be dissolved while maintaining the material and the electrode in a closely spaced relation while allowing a free flow of electrolyte therebetween;
   d. a second movable electrode in the vessel opposite and facing the first electrode and separated from the first electrode by the material to be dissolved including means for electrically insulating the electrode from the material to be dissolved while maintaining the material and the electrode in a closely spaced relation while allowing a free flow of electrolyte therebetween and including means for urging the second electrode toward the first electrode, said second electrode being adapted to rest on the material to be dissolved and to move with the material toward the first electrode as the material is dissolved, thereby maintaining the closely spaced relation between the first and second electrodes and the said material;
   e. means for passing a direct current between the first and second electrodes; and
   f. means for circulating a flow of electrolyte into the vessel between the first and second electrodes and the material to be dissolved.

2. The electrolytic dissolver of claim 1 wherein the second movable electrode is the cathode and is constructed of material selected from the group consisting of tantalum, niobium, platinum and stainless steel and the first fixed electrode is the anode and is constructed of a material selected from the group consisting of tantalum and niobium and having a platinum surface facing the cathode.

3. The electrolytic dissolver of claim 1 wherein:
   a. the vessel has a bottom, a vertical side wall, an open top and an electrolyte overflow outlet in the side wall between the bottom and the top;
   b. the first electrode is located on the bottom of the vessel below the material to be dissolved; and
   c. the second electrode is above the first electrode, extends downward into the vessel through the top thereof facing the first electrode, said electrode being adapted to rest on the material to be dissolved, so that the second electrode will move in a downward direction toward the first electrode as the material is dissolved.

4. The electrolytic dissolver according to claim 3 wherein the first and second electrodes contain openings for the passage of electrolyte therethrough and for directing the flow of electrolyte at the material to be dissolved.

5. The electrolytic dissolver of claim 4 wherein the second movable electrode is the cathode and is constructed of material selected from the group consisting of tantalum, niobium, platinum and stainless steel and the first fixed electrode is the anode and is constructed of a material selected from the group consisting of tantalum and niobium and having a platinum surface facing the cathode.

6. The electrolytic dissolver according to claim 5 wherein the bottom of the vessel contains an aperture therein, the anode has a disc-shaped top portion with an opening in the center thereof, resting on the bottom of said vessel and a tubular stem, one end of said stem being attached perpendicularly to the center of said disc at said opening and extending downwardly through said aperture in said bottom in a sealing relation therewith, the other end of the said stem being connected to said electrolyte circulating means whereby a flow of electrolytes through the stem passes through the disc and into the vessel.

7. The dissolver of claim 6 wherein the first insulating means is a basket of electrically insulative material for containing the material to be dissolved, said basket having a flat bottom containing a plurality of perforations and a vertical side wall, said flat bottom having a plurality of evenly spaced projections about the lower outer edge to support the basket above the disc portion of the anode, a plurality of evenly spaced bar-shaped projections on the inner face of the bottom to support the material, a plurality of vertical bar-shaped projections evenly spaced about the outer surface of the side wall to space the basket from the wall of the dissolver vessel and a plurality of vertical bar-shaped projections evenly spaced about the inner surface of the side wall to space the material to be dissolved from the wall.

8. The dissolver of claim 7 wherein the cathode has a disc-shaped electrode bottom portion with an opening in the center thereof and a tubular stem, one end of the stem being attached perpendicularly to the center of said disc at said opening, the stem extending upwardly out the top of the vessel, the second end extending upwardly out the top of said vessel, the second end of the stem being connected to the electrolyte circulating means whereby a flow of electrolyte through the stem passes through the disc and into the vessel directed at the material to be dissolved and the second insulating means is a plurality of button-shaped spacers attached to the disc, to space and insulate the disc from the material to be dissolved.

9. The dissolver of claim 8 wherein the anode is constructed of tantalum and the disc portion facing the material to be dissolved has attached thereto an additional disc of platinum.

* * * * *